United States Patent [19]

Laniado et al.

[11] Patent Number: 4,848,437
[45] Date of Patent: Jul. 18, 1989

[54] SUNBLIND

[76] Inventors: Josephe Laniado, 3/3 Mishol Haadmonit Street; Moshe Har-El, 6/1 Shaul Hamelech Street, both of Jerusalem, Israel

[21] Appl. No.: 4,342

[22] Filed: Jan. 16, 1987

[30] Foreign Application Priority Data

Jan. 24, 1986 [IL] Israel ............................. 77697

[51] Int. Cl.$^4$ ............................................. A47H 5/00
[52] U.S. Cl. ................................. 160/370.2; 160/238; 428/476.1; 428/906
[58] Field of Search ........ 160/368 S, DIG. 3, DIG. 2, 160/DIG. 7, 238, 120, 121 R, 122, 23 R; 296/97 R, 97 A, 97 G, 97 J, 97 F, 95 R, 95 Q, 95 C; 428/476.1, 906

[56] References Cited

U.S. PATENT DOCUMENTS

| 2,826,523 | 3/1958 | Blaszkowski et al. ...... 160/238 X |
| 3,236,290 | 2/1966 | Lueder ............................ 160/241 |
| 4,202,396 | 5/1980 | Levy ............................. 160/107 |
| 4,433,711 | 2/1984 | Lew .............................. 160/120 |
| 4,615,922 | 10/1986 | Newsome et al. ........ 428/476.1 X |
| 4,671,558 | 6/1987 | Cline ........................... 296/97 R |

FOREIGN PATENT DOCUMENTS 1955584 5/1971 Fed. Rep. of Germany .... 296/95 Q
42766 7/1973 Israel .

Primary Examiner—Blair M. Johnson
Attorney, Agent, or Firm—Lowe, Price, LeBlanc, Becker & Shur

[57] ABSTRACT

The invention provides a sunblind comprising a sheet of rollable fibrous or plastic material capable of alternating between a relaxed and a tensioned state. The sunblind material is pretreated to inherently assume a rolled up configuration in its relaxed state. The blind contains material which interferes with at least a substantial portion of solar radiation impinging thereon in its tensioned unrolled state.

15 Claims, 1 Drawing Sheet

U.S. Patent
Jul. 18, 1989
4,848,437
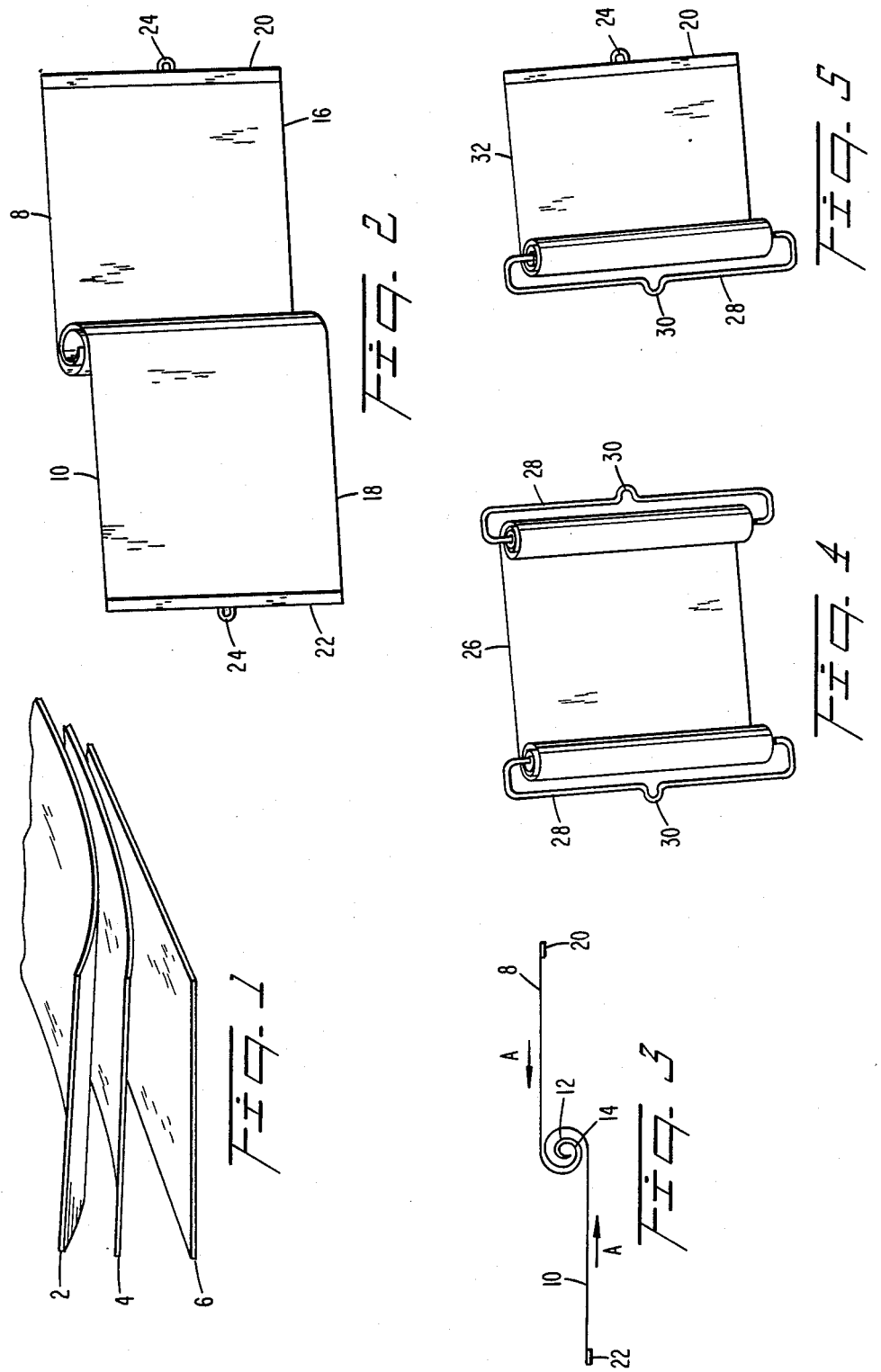

SUNBLIND

BACKGROUND OF THE INVENTION FIELD OF THE INVENTION

The present invention relates to a sunblind. More particularly the present invention relates to a sunshade or sunblind adapted for attachment across a window surface and especially to a sunblind for protecting the interior of a motor-vehicle against sun rays and glare and to a specially prepared sheet material for use therein.

DESCRIPTION OF THE BACKGROUND

As described in Israel Pat. No. 42796 and U.S. Pat. No. 4,202,396, the state of the art of sunshades for motorcars before said patents generally fell into two main categories: Outdoor and indoor. The outdoor devices were comprised of an arcuate semi-transparent member mounted above the upper portion of the front window. These devices filter and shade part of a interior of the car only when the sun is at the higher part of its orbit.

The indoor means were either curtains or venetian blinds which were permanently affixed to the side or rear window frames. Alternatively, for the protection of front window, plain flat sheets of any rigid material were used which were dimensioned that they could be placed on the dashboard cover.

Israel Pat. No. 42796 and U.S. Pat. No. 4,202,396 changed the state of the art by providing a foldable sunblind for motor-car windows characterised by a self-contained unit adapted to assume either a stretched position forming a substantially continuous partition detachably mountable at the inner side of said windows, or a collapsed position, forming box-like package said unit comprised a series of planar rectangular board elements foldably jointed to each other along their longitudinal edges. At least two flaps were integrally provided with two space elements adapting the said partitions to be appended from a fitting of the motorcar.

Said sunblinds are today by far the most popular and widely sold of the various types now on the market. However, they suffer from several major disadvantages.

Firstly, the folding and unfolding process is tedious due to the fact that the sunshade with its rigid joined panels is cumbersome since each panel measures about 60 cm×13 cm and each shade contains about ten such panels.

Secondly, even in its folded state said sunshade occupies substantial space on the floor of a car when not in use and is constantly getting underfoot and in the way. Moreover, the folded blind is to be held together by a rubber band which is frequently easily lost.

For several years there has also been available on the market a sunblind formed of a sheet of thin rollable plastic laminated with a thin sheet of aluminum foil and provided at its ends with means for attachment across a car window surface.

While such a shade is much more compact in its rolled state than the box-like package of joined rectangular panels, the rolling and unrolling thereof is also time-consuming and annoying.

With this state of the art in mind and especially in light of the widespread need for sunshades which would protect the interiors of motor vehicles from the sun's heat and harmful bleaching rays and the aforementioned dissatisfaction with the disadvantages of the presently marketed products, there is now provided a new type of sumblind which ameliorates the above problems and provides a much more convenient and easy to use and store sunblind than those that have been heretofore available.

SUMMARY OF THE INVENTION

Thus according to the present invention there is now provided a sunblind comprising a sheet of rollable fibrous or plastic material capable of alternating between a relaxed and a tensioned state and pretreated to inherently assume a rolled-up configuration in said relaxed state, said blind containing material interfering with at least a substantial portion of solar radiation impinging thereon in said tensioned unrolled state.

DESCRIPTION OF THE PREFERRED EMBODIMENTS

In a first embodiment of the present invention, said sheet comprises a layer of rolled cardboard imparted with an internal structure which inherently causes it to assume said rolled up configuration in its relaxed state.

In a second embodiment of the present invention said sheet comprises a layer of rolled polyethylene imparted with an internal structure which inherently causes it to assume said rolled up configuration in its relaxed state.

In especially preferred embodiments of the present invention there is provided a sunblind comprising a multilayered plastic sheet having at least two layers of plastic material joined to each other at states of different relative stretch, said blind comprising means for attachment of the ends thereof across a window surface wherein upon release of at least one of the ends of said sheet, said sheet will spontaneously roll up upon itself as a result of the different states of stretch of the respective layers.

In said preferred multilayer sunblind said sheet can be made of a layer of polyethylene joined to a layer of nylon which materials have different states of stretch and which sheet can be preferably formed of coextruded layers of polyethylene and nylon the ratio of polyethylene to nylon in said layers being between about 90:10 and 70:30 and preferably being about 80:20.

Alternatively, said multilayer sheet preferably comprises two layers of polyethylene plastic material joined to each other while in different states of relative stretch.

Preferably said sheets also comprise a layer of reflecting material for reflecting at least part of the solar radiation impinging therein and especially preferred is a pretensioned, inherently self-rolling sheet according to the present invention having a layer of reflective aluminum foil incorporated therein.

Said multilayered sheet can also be prepared using a layer of shrinkable PVC which can be attached to a layer of another material such as heavy duty paper or aluminum foil and then heat shrunk.

While the sunblinds according to the present invention can be made to roll up around a fixed rigid support provided at one or at both of its ends in a scroll like fashion, in preferred embodiments of the presnt invention said blind roll up around an axis established at some midpoint between its edges as described and explained more fully hereinafter.

Thus in one preferred embodiment of the present invention there is provided a selfrolling sunblind according to the present invention comprising two sheets concentrically and substantially coextensively interrolled with one edge of a first sheet joined to an aligned edge of a second sheet said joined edges serving substantially as the axis around which said blind rolls up in said relaxed state, the respective unjoined ends of said sheets being provided with means for attachment across a window surface.

The present invention also provides such a sunblind in combination with a window of a motor vehicle.

Alternatively, there is provided a self rolling sunblind according to the present invention wherein said sheet is provided with a fold line across one of the axes thereof, said fold line dividing said sheet into two concentrically and substantially coextensively interrolled portions, said fold line serving substantially as the axis around which said blind portions roll up in said relaxed state.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 1 is a schematic representation of a three layered pretensioned laminar sheet from which a preferred blind of the present invention is formed.

FIG. 2 is a schematic perspective view of a sunblind in its unrolled state.

FIG. 3 is a cross-sectional view of FIG. 2.

FIG. 4 is a further embodiment of a blind according to the invention partly rolled up on both of its lateral sides.

FIG. 5 is another embodiment of a blind according to the invention partly rolled up at one of its lateral sides.

DESCRIPTION OF THE PREFERRED EMBODIMENTS IN RELATION TO THE DRAWINGS

In to FIG. 1, there is schematically shown a portion of a sunblind according to the present invention in its tensioned unrolled configuration. This blind is composed of a first sheet of polyethylene terephthalate 2 laminated to a second sheet of aluminum foil 4 which is in turn laminated to a third stretched sheet of polyethylene terephthalate 6. (see, Example 2 below) As explained hereinbefore, due to the different states of stretch of the respective layers, the blind will inherently and spontaneously roll up upon itself when not secured in a tensioned unrolled configuration.

In FIGS. 2 and 3 there is schematically shown an especially preferred embodiment of the present invention in which two pretensioned sunblind sheets 8, 10 according to the present invention are joined together by the welding of one edge 12 of a first sheet 8 to an aligned edge 14 of the second sheet 10. This welding is attained in an arrangement whereby due to the internal tension of each sheet they will concentrically roll around each other, with said joined edges 12 and 14 serving substantially as the axis around which said blind rolls up in its relaxed state.

The two unjoined ends 16, 18 of said sheets are each attached to a PVC rigidifying strip 20, 22 provided with apertures 24 attachable to hooks (not shown) affixed to both ends of the window to be covered.

The thus prepared blind, when released, spontaneously rolls up upon itself in the direction of arrows A as a result of the different states of stretching of the pretensioned sheets of the present invention.

It will be realized that instead of joining edges 12 and 14 of two separate sheets 8 and 10 as shown, the same effect can be achieved by using a press to form a permanent fold line in a single sheet at the area where edges 12 and 14 are shown as joined in FIG. 3.

In FIG. 4, there is illustrated another embodiment of the present invention in which a pretensioned sunblind sheet 26 according to the present invention is attached at both of its ends to a bow-like holder 28. Said holders are provided with eyelets 30 for attachment to hooks (not shown) affixed to both ends of the window to be covered.

Similarly, in FIG. 5 there is illustrated a pretensioned sun blind sheet 32 which rolls up around a single bow-like holder 28 and is provided at its other end with a rigidifying strip 20 provided with an aperture 24 and attachable as described with reference to FIGS. 2-4.

In light of the above description it should be realized that in its broadest aspect the present invention also provides a sheet of rollable fibrous or plastic material capable of alternating between a relaxed and a tensioned state and pretreated to inherently assume a rolled-up configuration in said relaxed state which can have other uses as well such as serving as the basis for a self rolling map.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defiend by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of preparation procedures as well as of the principles and conceptual aspects of the invention.

EXAMPLES

Example 1

Cardboard Sunblind

A corrugated cardboard 45 cm in length and 2 mm in thickness having two outer smooth layers and an inner wavey layer is soaked in water and then tightly rolled to form a cylinder having a diameter of about 2 cm.

The tightly wound cylindrical shape is maintained by wrapping with rubber bands or cords and the rolled cardboard is then dried in an oven at 40° C. for one hour.

After drying and removing the restraining ties the cardboard is capable of alternating between a relaxed, rolledup configuration and a tensioned, unrolled configuration.

The lateral edges of the cardboard strip are then provided with rigidifying strips having suction cups at the ends thereof, whereby in its unrolled configuration it is attachable to a window surface as a sunblind therefore. Alternatively said sheet is provided with attachment means as shown in FIGS. 4 or 5.

In this embodiment the fibrous material or the cardboard serves impart to the blind its sun reflecting property.

Example 2

Polyethylene Sunblind with Aluminum Foil Sunblock

A sheet of polyethylene terephthalate 25 microns thick, is glued to a sheet of 12 micron thick aluminum foil in a laminating machine (Faustel, Butler Wisconsin) to form a first composite sheet.

A second sheet of polyethylene terephthalate, 50 microns thick, is stretched 10% in an oven at 225° C. This stretched sheet is then glued to the aluminum foil side of said first composite sheet in said laminating machine to form a second composite sheet.

Said second composite sheet is rolled on a spool and dried at room temperature for 48 hours with the second sheet of polyethylene material on the inside.

After drying, the sheet is cut into smaller sheets measuring 45 by 60 cm, two such smaller sheets are superposed and one edge of a first sheet is heat welded to an aligned edge of a second sheet.

The jointed sheets spontaneously concentrically roll up upon themselves with said welded end serving substantially as the axis around which said sheets roll up.

In order to assure that this inherent property of spontaneous rolling up is retained even after prolonged exposure to sunlight and heat, the rolled up blind is introduced into a plastic bag, the air removed therefrom by vacuum to limit ozonization and the blind is subjected to 5,000,000 units of radiation from a Cobalt 60 irradiator.

Example 3

Polyethylene and Nylon Coextended Sunblind with Pigment as Sunblock

Polyethylene granules intermixed with white pigment and nylon granules are separately fed to the inlets of a co-extruder in relative proportions of 80% polyethylene to 20% nylon to form a continuous sleeve 50 cm wide, with the nylon on the outside and the polyethylene on the inside.

Said sleeve is cut into lengths of 45 cm each. Said cut sleeves are then cut along their length to form a sheet 100 by 45 cm which immediately upon cutting, spontaneously rolls upon itself with the nylon on the inside and the polyethylene on the outside due to the difference in the states of stretch of the nylon and polyethylene layers.

Said sheet can then be cut into two sheets, superposed and welding along an aligned edge as described in example 2 or attached to and wound around one or more support as shown in FIGS. 4 and 5.

In order to assure that this inherent property of spontaneous rolling up is retained even after prolonged exposure to sunlight and heat the rolled up blind is introduced into a plastic bag, the air removed therefrom by vacuum to limit ozonization and the blind is subjected to 5,000,000 units of radiation from a Cobalt 60 irradiator.

In this embodiment the pigment incorporated in the polyethylene layer serves to impart to the blind its sun reflecting property.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. The sunblind for protecting the interior of a motor vehicle against sun rays and glare comprising a multilayer plastic sheet of rollable material comprising at least two layers of material joined to one another at states of different relative stretch, said sheet being capable of alternating between a relaxed and a tensioned state and pretreated to inherently assume a rolledup configuration around an axis in said relaxed state as a result of the different states of stretch of the layers, and being further pretreated to retain said inherent property of spontaneous rolling up even after prolonged exposure to sunlight and the heat generated in the interior of a closed motor vehicle exposed to sunlight, said blind containing material interfacing with at least a substantial portion of solar radiation impinging thereon in said tensioned unrolled state, and, said blind further comprising means for attachment of the ends thereof across a window surface wherein upon release of at least one of the ends of said sheet, said sheet will spontaneously rollup upon itself as a result of the different states of stretch of the respective layers.

2. The sunblind of claim 1 wherein
said plastic sheet comprises a layer of rolled polyethylene material imparted with an internal structure which inherently causes it to assume said rolled up configuration in its relaxed state.

3. The sunblind of claim 1, further comprising
a layer of reflecting material for reflecting at least part of the solar radiation impinging thereon.

4. The sunblind of claim 3, wherein
said reflective material is a layer of aluminum foil.

5. The sunblind of claim 1, wherein
said plastic sheet comprises a layer of polyethylene joined to a layer of nylon.

6. The sunblind of claim 5, wherein
said plastic sheet is formed of co-extruded layers of polyethylene and nylon in a ratio thereof of about 90:10 to 70:30.

7. The sunblind of claim 1, wherein
said plastic sheet comprises two layers of a polyethlene plastic material joined to one another while in different states of relative stretch.

8. The sunblind of claim 1, wherein
said plastic sheet comprises two plastic sheets concentrically and substantially coextensively inter-rolled with one another at respectively aligned edges thereof; said inter-rolled edges serving substantially as the axis around which said blind rolls up in said relaxed state; the respective unjoined ends of said sheets opposite the inter-rolled ends being provided with said means for attachment across said window surface.

9. The sunblind of claim 1, wherein
said plastic sheet is provided with a fold line across an axis thereof, said fold line dividing said sheet into two concentrically and substantially coextensively inter-rolled portions thereof and substantially serving as the axis around which said sheet portions roll up in said relaxed state.

10. The sunblind of claim 1 in combination with a windshield of a motor vehicle.

11. A multilayer plastic sheet of rollable material comprising at least two layers of material joined to one another at states of different relative stretch and capable of alternating between a relaxed and a tensioned state and pretreated to inherently assume a rolled-up configuration in said relaxed state as a result of the different states of stretch of the respective layers and being further pretreated to retain said inherent property of spontaneous rolling up even after prolonged exposure to sunlight and the maximum heat generated in the interior of a closed motor vehicle exposed to sunlight.

12. The sheet of claim 11 comprising a layer of rolled polyethylene material imparted with an internal structure which inherently causes it to assume said rolled up configuration in its relaxed state.

13. The sheet of claim 11 comprising a layer of polyethylene joined to a layer of nylon.

14. The sheet of claim 11 comprising two layers of a polyethylene plastic material joined to one another while in different states of relative stretch.

15. The sheet of claim 11, further comprising
a layer of reflecting material for reflecting at least part of the solar radiation impinging thereon.

* * * * *